Sept. 24, 1946.  H. L. HULL ET AL  2,408,069
GUN POSITIONING SYSTEM
Filed May 1, 1942  3 Sheets-Sheet 1
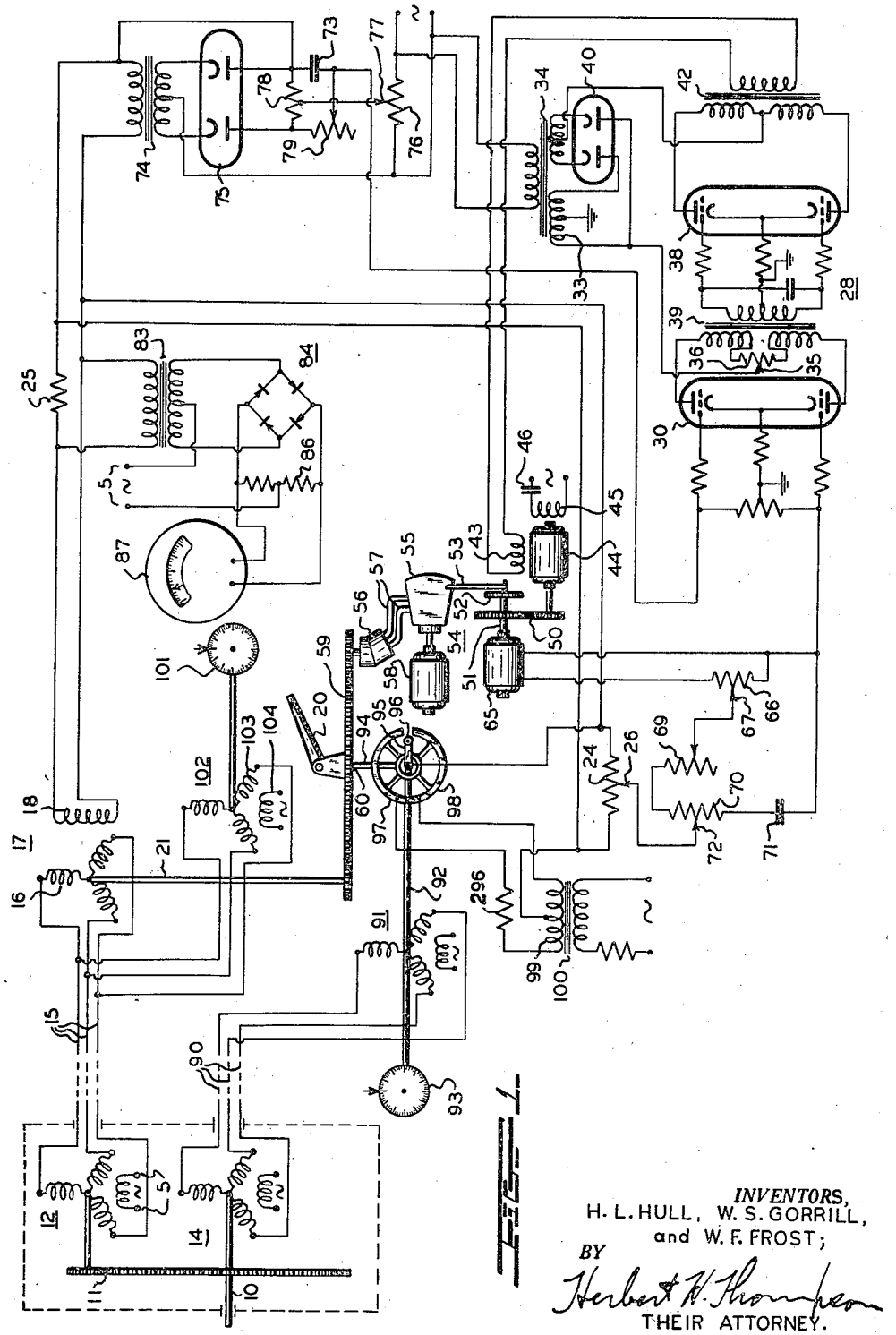
INVENTORS,
H. L. HULL, W. S. GORRILL,
and W. F. FROST;
BY
Herbert H. Thompson
THEIR ATTORNEY.

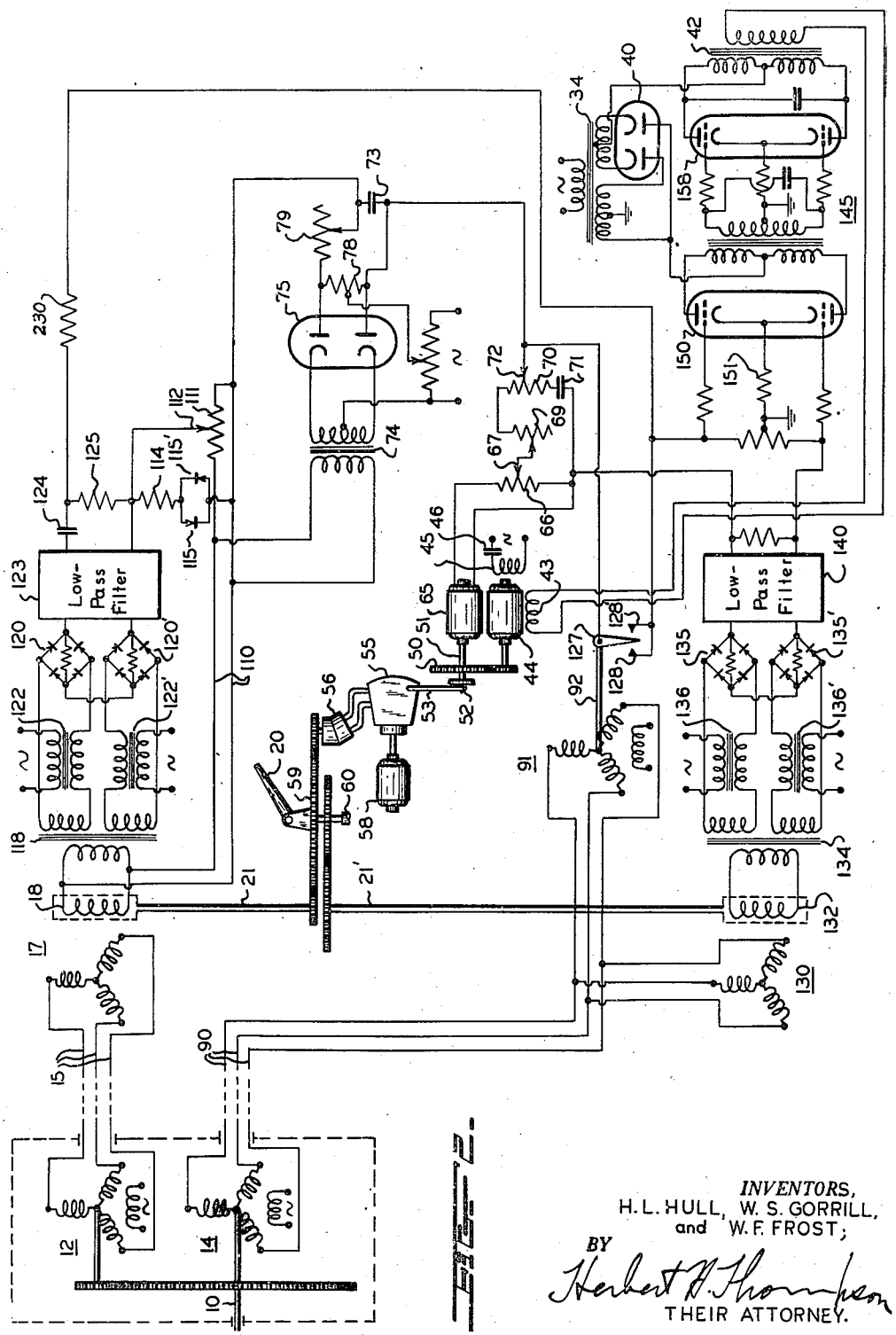

Sept. 24, 1946.   H. L. HULL ET AL   2,408,069
GUN POSITIONING SYSTEM
Filed May 1, 1942   3 Sheets-Sheet 3
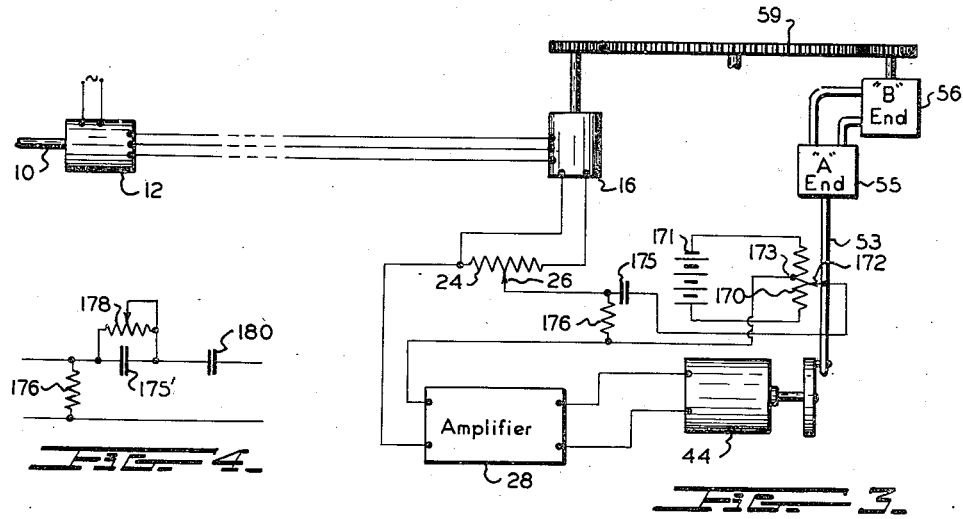
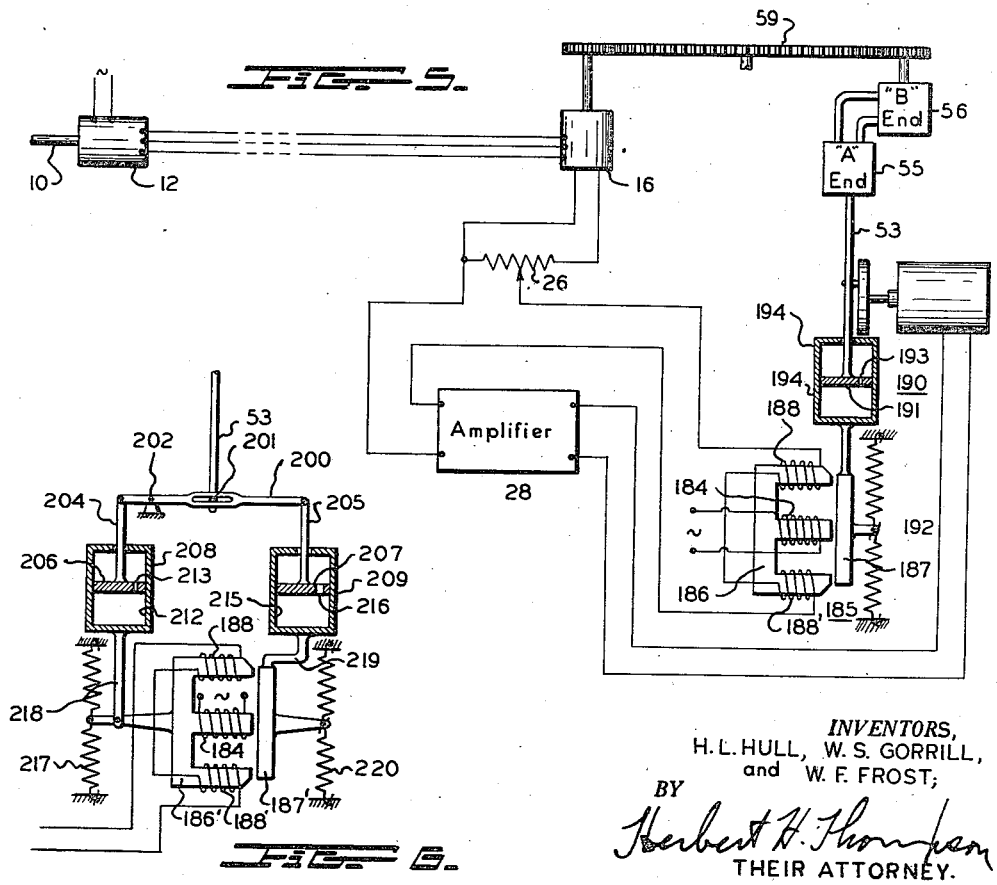
INVENTORS,
H. L. HULL, W. S. GORRILL,
and W. F. FROST;
BY
THEIR ATTORNEY.

Patented Sept. 24, 1946

2,408,069

UNITED STATES PATENT OFFICE 2,408,069

GUN POSITIONING SYSTEM

Harvard L. Hull, East Williston, William S. Gorrill, Brooklyn, and William F. Frost, Williston Park, N. Y., assignors to Sperry Gyroscope Company, Inc., Brooklyn, N. Y., a corporation of New York Application May 1, 1942, Serial No. 441,400

32 Claims. (Cl. 60—53)

This invention relates to systems for automatically positioning guns or other objects possessing substantial inertia in accordance with positional data supplied from a remote source, for example in the case of gun positioning systems, from a fire control director. The present application refers, more particularly, to automatic positioning systems of the general type described in our pending application Serial No. 425,146, filed December 31, 1941.

In general, the system disclosed herein comprises apparatus adapted to receive positional data from a remote source in the form of a variable electric quantity and to position the gun or other positionable object in accordance with the data by controlling the speed of a variable speed hydraulic drive connected to drive the object. It is highly desirable that the gun shall follow as closely as possible in synchronism with the changing data and that the motion of the gun shall be smooth and without oscillation due to the effects of inertia and elasticity of the moving elements or other characteristics of the system, that is, that the system shall be free from hunting tendencies. These results are accomplished by the use of electrical circuits which introduce stabilizing control terms involving the element of time either as rates or integrals of primary quantities to cause modifications of the speed of the hydraulic drive or drives.

In the above-mentioned application 425,146 electrical quantities representing rates of change of a number of quantities are obtained by the use of individual electric generators whose outputs are proportional to the respective speeds at which they are driven. In the system of the present application, a different and in some respects simpler arrangement is adopted in that only one generator is employed for each channel, e. g., the azimuth control channel, in which a generator is driven by or with the speed control member of the hydraulic drive, and control terms other than the one furnished directly by this generator are obtained by the use of electrical integrating and differentiating circuits.

Another feature which distinguishes the present application from the above-mentioned pending application is the use of a circuit which compensates for variations in the characteristics of amplifier tubes and other electrical elements and also compensates for positional lag of the controlled object accompanying acceleration of that object. A further distinguishing feature is the type of synchronizing means employed to enable control to be exercised solely by a coarse data channel when the range of control of a fine channel is exceeded.

One object of the invention is to provide automatic control of the aiming of a gun in accordance with positional data received from a remote source.

Another object is to provide a remote control system which is free from hunting tendencies.

Another object is to provide a system in which the controlled object follows the data with little or no lag.

Another object is to provide in a positional control system, means for obtaining and utilizing control terms suitable for damping out undesired oscillations of movable members of the system.

Another object is to provide in a positional control system, means for obtaining and utilizing control terms proportional to rates of change or higher derivatives of the displacements of various movable members therein.

Another object is to provide in a system of the above character electrical integrating and differentiating circuits for generating electrical quantities representing functions of the displacements of elements of the system.

Still another object is to provide in a positional control system having fine and coarse control channels, improved means for shifting control between these channels dependent upon the magnitude of the error in following.

Other objects and advantages of the present invention will become apparent as the description proceeds.

Referring to the drawings,

Figure 1 is a schematic diagram of a gun positioning system embodying one form of the invention.

Figure 2 is a schematic diagram of a modification of the system of Figure 1.

Figure 3 is a simplified diagram of another form of control system according to the invention.

Figure 4 is a diagram of a modification of a detail of Figure 3.

Figure 5 is a diagram of still another modified system, related to that of Figure 3.

Figure 6 is a schematic showing of a modified detail of Figure 5.

Referring now to Figure 1, the apparatus units shown at the upper left-hand corner are angular data transmitters which are normal elements of a gunfire director, for example, of the type described in U. S. Patent No. 2,065,303, to E. W. Chafee et al., dated December 22, 1936. These transmitters, and the remainder of the system shown schematically in Figure 1, constitute a control channel governing the aiming angle of the gun in azimuth only, it being understood that a similar grouping of apparatus or channel will generally be employed to govern the elevation angle.

The computed value of gun azimuth angle is represented at the director by the angular position of shaft 10 which drives rotors of fine and coarse Selsyn transmitters 12 and 14 at different rates as determined by gearing 11. These transmitters have stator windings excited from the same source of alternating current 5 which preferably, to secure a uniform frequency, is a common supply for the system. Fine transmitter 12 which is driven at the faster rate and therefore generates a greater signal voltage for a given displacement of shaft 10, is connected by three-conductor transmission line 15 to the rotor 16 of Selsyn receiver 17 which is operated as a synchro transformer or signal generator by having its rotor 16 driven from gun 20 by way of shaft 21 and intermediate gearing. In connection with this description, it will be understood by those skilled in the art that the three-part winding and single part winding of a Selsyn transmitter such as 12 are interchangeable as to their mounting on the stator or rotor.

Connected across stator winding 18 of receiver 17 is a potential divider resistance 24 in series with a fixed resistance 25. An adjustable tap 26 determines the portion of the potential drop across resistance 24 which is applied to the input of balanced amplifier 28 in combination with certain modifying potentials, means for obtaining which will be later described. Amplifier 28 has a first stage serving as an amplifier-modulator receiving both an alternating and direct current input, and comprising tube 30, having a pair of triode elements. The A. C. plate potential for tube 30 is supplied from the portion of secondary winding 33 of supply transformer 34 between the left-hand terminal and ground and is applied between ground and an electrical mid-tap 35 on plate resistance 36. Tap 35 may be shifted slightly to one side or the other of the geometrical center of resistance 36 in order to compensate for dissimilarities in the properties of the two triode elements of tube 30.

The output of tube 30 is coupled to the succeeding amplifier stage, comprising double triode tube 38, by means of coupling transformer 39. The plate circuits of tube 38 are supplied with a unidirectional voltage derived from the output of full-wave rectifier tube 40, which in turn is supplied with alternating current from winding 33 of transformer 34. The output of tube 38 is supplied by way of coupling transformer 42 to one stator winding 43 of two-phase motor 44, whose other stator winding 45 is supplied with alternating current from the common source through phase adjusting means, shown as condenser 46.

Motor 44, through gearing 50, drives shaft 51 on which is mounted crank 52, operatively connected to position, longitudinally, stroke rod 53 of variable speed transmission 54 comprising variable displacement pump 55 and variable speed hydraulic motor 56, the pump and motor being connected by pipes 57. One form of this combination of pump and motor suitable for our purposes is well known in the art as the "Vickers" variable speed hydraulic drive. Details of this drive will not be described in the present application. The pump 55, known as the "A" end of the drive, is continuously operated by a motor 58, which may be connected to any suitable electrical source. The hydraulic motor or "B" end 56 is connected through gearing to rotate the platform 59, on which gun 20 is mounted, about pivot 60 to position the gun in accordance with the received azimuth data. The speed at which hydraulic motor 56 operates is substantially a linear function of or dependent upon the position of the stroke rod 53, in accordance with the known operating characteristic of the Vickers drive. The modifying effects of leakage and other variable factors will be discussed hereinafter.

Safety features such as relief valves, stops and power limiting devices as well as manual control arrangements which may be used with any form of the present invention in connection with the hydraulic drive are omitted from the figure for simplicity of illustration since these features are fully disclosed in our pending application No. 425,146, above referred to.

Motor 44 drives a D. C. generator 65 across whose output is connected a potential divider resistance 66, from which a drop of potential, determined by the position of adjustable contact 67, is supplied to an integrating or damping control circuit comprising adjustable resistance 69 fixed resistance 70 and condenser 71. Gearing (not shown) may be interposed between shaft 51 and generator 65.

The potential across the condenser 71 and a portion of resistance 70, as determined by the position of adjustable contact 72, is applied to the input of amplifier 28 in series with the potential drop taken from resistance 24 and in series with a further potential across condenser 73 forming a part of a second integrating circuit. The last circuit mentioned derives its input from transformer 74, bridged across the entire potential divider resistance 24. The output of transformer 74 is applied to a phase-sensitive rectifier circuit comprising rectifier tube 75 having a pair of diode elements and which receives as an A. C. bias a portion of the drop across potential divider resistance 76. Resistance 76 is connected across the common A. C. supply and has an adjustable tap 77. This A. C. bias is applied between a mid-tap on the secondary winding of transformer 74 and a mid-tap on resistance 78 bridged across the two plates of tube 75. An adjustable resistance 79 connected between one end of resistance 78 and condenser 73 completes the integrating circuit.

For indicating the error in following the data a circuit is bridged across the output of winding 18 of synchro transformer or signal generator 17, comprising bridging transformer 83, to the secondary winding of which is connected a full-wave bridge-type rectifier 84 biased by an alternating potential derived from common A. C. source 5. To obtain a phase-sensitive device, the alternating potential from source 5 is applied between a mid-tap on the secondary winding of transformer 83 and a mid-tap on a resistance 86, which resistance is connected across the output terminals of the rectifier 84. The output of rectifier 84 is indicated by zero-center direct current meter 87.

Returning now to shaft 10, which is the source of the input azimuth data, this shaft as has been noted, in addition to driving fine transmitter 12 drives coarse transmitter 14 which is connected by way of three-conductor transmission line 90 to the rotor of coarse Selsyn receiver 91, having a stator excited from the common A. C. source. This receiver operates as a free rotor device and rotor shaft 92 mounts at one end a dial 93 for indicating the received azimuth angle. At the other end shaft 92 mounts an arm 95 carrying a contact roller 96 adapted to make contact with either of contact segments 97 or 98 for synchronizing purposes. Segments 97 and 98 are connected to opposite ends of center-tapped secondary winding 99 of transformer 100, having a primary winding supplied from source 5, and are rotated in correspondence with the gun by way of shaft 94. The making of a contact between roller 96 and either of segments 97 or 98 supplies, as a synchronizing impulse, the voltage existing across one-half of winding 99 to a circuit which includes winding 18 of Selsyn receiver 17 and resistance 25 in series and which is in parallel with resistance 24. 180 degrees from the position shown in the drawings, roller 96 makes contact with segments 97 and 98 simultaneously. To prevent loss of the coarse signal from this cause a resistance 296 is inserted in circuit with segment 97 which prevents a complete short-circuiting of winding 99.

In addition to coarse azimuth dial 93 a fine azimuth angle dial 101 may be provided driven by rotor 103 of Selsyn receiver 102 whose windings are bridged across transmission line 15. Stator 104 of this receiver is excited from the common A. C. source.

The operation of the above described system is as follows: Assuming that a displacement of shaft 10 occurs representing a change of gun azimuth angle as computed by the director and that the displacement is within the range of control of the fine transmission channel, the rotor of transmitter 12 is displaced through a proportional angle determined by the ratio of gears 11 and the displacement of this rotor causes a corresponding A. C. signal to be transmitted over transmission line 15 to rotor 16 of the Selsyn synchro transformer or receiver 17, and thereby induces an A. C. voltage in stator winding 18 of this receiver, before the gun starts to move, which is likewise proportional to change of azimuth angle. The voltage in winding 18 (less the drop occurring in resistance 25) is applied across potential divider resistance 24 and the potential difference between the left-hand end of this resistance and the point of contact of adjustable contact 26 is applied to the input of amplifier 28 in series with the D. C. damping voltage, obtained from the drop across a portion of resistance 70 and condenser 71, and a D. C. unbalance compensating voltage obtained from the drop across condenser 73.

The voltage in winding 18 which will be referred to as the error signal, since it represents the error of gun 20 in following the received data, is of one of two opposite phases, dependent upon the sense of the error. The portion of this signal which is utilized in controlling the output of amplifier 28 is selectively controllable by means of adjustable contact 26. This A. C. signal input voltage is amplified by tubes 30 and 38 and applied to stator winding 43 of two-phase motor 44.

The reaction of the fields due to current in winding 43 and the quadrature current in winding 45 of motor 44 causes the operation of this motor in one direction or the other according to the phase of the current in winding 43. Motor 44, through gears 50, drives crank 52 to position stroke rod 53 longitudinally and thereby varies the displacement of pump 55 and correspondingly varies the speed of operation of hydraulic motor 56 and the rotation of platform 59 and gun 20. The displacement of stroke rod 53 is in a direction such that the resulting rotation of platform 59 about pivot 60 turns rotor 16 of receiver 17 by way of shaft 21 in a direction which eventually causes the voltage in winding 18 to be reduced to zero, and if no other control voltages were utilized stroke motor 44 would then cease rotating. The gun, however, would continue to rotate at a speed and in a direction determined by the final stroke rod setting. If the datum angle remained constant after the assumed initial change or changed at a slower rate than the gun position the gun would therefore eventually reach and pass through a position corresponding to this angle. Due to the resulting reversal of phase of the error signal supplied by winding 18 the direction of displacement of stroke rod 53 would then be reversed and the gun after decelerating would reverse its direction of rotation and accelerate in the opposite direction, and the described cycle of events would start over again. Apart from any effects of inertia and elasticity there is present, therefore, a tendency for the system to hunt if error signal control, only, is utilized.

Conditions similar to those described obtain when change of data occurs at a constant rate. For example, to correct a lag in gun position when operating at constant velocity, the stroke rod must be so positioned as to cause the gun position to change at a faster rate than the data. The rate of change of gun position may increase but it cannot be reduced until the error reverses in sign and thereby reverses the direction of the displacement of stroke rod 53. This necessity for a change of sign of the error in order to effect a change of direction of the displacement of the stroke rod again, as in the case of a constant azimuth angle, tends to cause the gun position to oscillate about the datum position.

To overcome the described hunting tendency some form of control is required which exerts a centralizing force on the stroke rod, and therefore is able to reduce the speed of operation of the gun without requiring a reversal in sign of the error signal.

Another cause of hunting is the fact that in a system such as has been described an object possessing considerable inertia is positioned by means having appreciable elasticity. In the described mode of operation under the control of the error signal, the effect of these properties has been neglected, it being implied that the control had to do with inertialess moving members, that no compression or leakage of fluid in the hydraulic system and no elastic deformation of the moving members occurred and that the stroke motor developed sufficient torque to effect practically instantaneous change of the displacement of the variable displacement pump of the hydraulic drive. In practice none of the above conditions obtains and as a result further causes of hunting are introduced tending to upset the stability of the gun, and which in addition tend to cause independent oscillation of stroke rod 53, usually at a frequency different from that of the hunting frequency of the gun.

The means for preventing hunting in the system of Figure 1 is the damping control circuit comprising resistances 69 and 70 and condenser 71 whose output is a voltage which may be considered to be made up of two components, one of which is effective in damping oscillation of the gun and the other oscillation of the stroke rod. The presence of said two components may be explained as follows: If one assumes a sine wave hunting of the control, the voltage output of the integrating circuit would be shifted 90° if the integrating circuit were perfect. However, as an electrical integrating network with practical time constants does not give perfect integration, the voltage phase shift is somewhat less than 90°. Therefore, the voltage vector has two components, one in phase with the voltage input and the second at 90° to this input, the in-phase component being used to damp the stroke rod mechanism and the 90° component being used as the primary damping function for the major servo loop, the stroke system consisting of the motor 44, generator 65 and rod 53 of the amplifier integrating network and the main servo loop including the gun itself, the Vickers hydraulic unit and the signal producing means.

The voltage supplied by generator 65 is proportional to the rate of change of position of stroke rod 53. By making the time constant (i. e., the product RC), of the circuit which includes condenser 71 and resistances 69 and 70, high, the charge on the condenser and hence the voltage across its terminals (each being proportional to the time integral of the charging current) may be made substantially proportional to the integral of the voltage supplied by generator 65, that is proportional to the integral of the stroke rod velocity, which integral in turn is proportional to stroke rod displacement. The value of the time constant of the integrating circuit determines whether complete or only partial integration takes place. When suitably introduced into the circuit the voltage across condenser 71, by its effect upon the operation of motor 44, is capable of furnishing a control force of the nature of that supplied by a centralizing spring tending to return stroke rod 53 to a neutral position. This is, therefore, a suitable control to prevent the hunting tendency otherwise present when the stroke rod setting is governed solely by the error signal, as hereinbefore discussed. Further consideration will show that since the stroke rod displacement governs the velocity at which the gun is driven the voltage across condenser 71 varies in phase with changes of gun velocity, and therefore this voltage, by exercising control in the proper direction, is capable of applying to the gun a force, opposing oscillation, which is proportional to gun velocity, that is, a damping force. This is in accordance with the well-known principle that to damp a mechanical oscillation, a periodic force of the same periodicity as the oscillation and having a phase opposite to that of the velocity of the oscillation is required.

In addition to the voltage across condenser 71 a portion of the voltage across resistance 70, as determined by the position of adjustable tap 72, controls motor 44 through amplifier 28. The voltage drop in resistance 70 is due to the charging current of condenser 71 and under the described circuit conditions this current is substantially proportional to the voltage of generator 65, that is, to the velocity of stroke rod 53. The utilized portion of this voltage, therefore, is in suitable phase relationship to the displacement of rod 53 to be effective in damping oscillations of the rod.

By varying the value of resistance 69 the time constant of the damping control circuit may be adjusted to an optimum value relative to the response characteristic of the system. By adjusting the position of contact 72 on resistance 70 an independent adjustment of the ratio of stroke rod damping to gun damping is had, while the position of contact 67 on potential dividing resistance 66 determines the magnitude of the total damping control. The charge which condenser 71 acquires during acceleration or deceleration of the gun leaks off when a constant velocity is attained which allows the system to operate without speed lag, as will be further pointed out.

The D. C. output of the damping control circuit, which includes the voltage drop across condenser 71 and that across the selected portion of resistance 70, is applied to the grids of tube 30 of balanced amplifier 28, in series with the A. C. error voltage and a further control voltage substantially proportional to the time integral of the error. The D. C. damping voltage is converted to an A. C. component of the amplifier output by the unbalancing of the two halves of the grid circuit of tube 30 which it brings about, this unbalancing causing unequal fluctuating plate currents to flow through the two halves of the primary winding of transformer 39 with a resulting input to tube 38.

In the description of the operation of balanced amplifier 28, it has been assumed that the two triode elements of tubes 30 and 38, have similar characteristics which enable a balance between the two halves of the circuit on opposite sides of ground to be maintained. Such similarity of characteristics, however, does not always exist and in order to effect a partial correction for tube unbalance, when this occurs, tap 35 on plate resistance 36 may be shifted slightly to one side or the other of the center of this resistance as has been described. This adjustment, however, becomes tedious with change of tubes and change of other circuit conditions and in order to avoid frequent changes of the position of tap 35, we provide circuit means, comprising full-wave rectifier tube 75 and associated elements, for obtaining a signal voltage which compensates for the effect of unbalance in the amplifier tubes over a period of time, and also substantially reduces the lag in following which occurs when the gun is accelerating.

For this purpose, a voltage derived from the alternating current error signal of winding 18 by way of transformer 74 is rectified in tube 75 and, in a known manner by means of the A. C. bias from potential divider 76, a phase sensitive circuit is obtained in which the D. C. potential across output or load resistance 78 reverses in polarity with reversal of phase of the input error signal. This reversible polarity voltage is applied to the integrating circuit comprising adjustable resistance 79 and condenser 73 and, as hereinbefore described in connection with the damping control circuit, by suitably adjusting the value of resistance 79 in proportion to the reactance of condenser 73, the rate at which the voltage across condenser 73 increases or decreases may be controlled and a substantial integration obtained. This condenser voltage, which is dependent upon the magnitude of the error and the period of time over which it persists, is the utilized unbalance correction voltage and is applied as a D. C. input in series with the error voltage and the damping voltages to amplifier 28 and there converted into an A. C. component of the amplifier output as a result of the change of the D. C. bias on the grids of tube 30.

When the two triode elements of tube 30 or of tube 38 have dissimilar characteristics there results a persistent unbalance output voltage from amplifier 28 which is applied to winding 43 of motor 44 causing a persistent error in following of the gun. The error signal derived from winding 18 as a result of this error in following, when rectified by tube 75, charges condenser 73 and builds up a voltage across the terminals of the condenser and this voltage, applied in the proper sense, is effective in reducing the error by increasing the output of amplifier 28 beyond its normal output for a given error. The effect of this change of output is to change the speed of operation of the gun in the proper sense to cause the error to be wiped out.

Another source of error is that when the gun is accelerating the position of stroke rod 53 is continually changing resulting in an undesired output from generator 65 which induces a voltage across resistance 70 and condenser 71 of the damping control circuit.

This output of the damping circuit tends to cause a lag in the following of the gun. However, by the operation of the error integrating circuit, condenser 73 receives an input proportional to the error in following during acceleration which causes a charge to be built up on the condenser and the resulting voltage across the condenser terminals becomes effective in reducing this acceleration lag in the same manner that unbalance errors are wiped out.

It will be noted that to a certain extent, the effect of the voltage across condenser 73 is in opposition to the effect of the output from the damping circuit including condenser 71. There is a difference in these effects, however, due to the different time constants of the damping control circuit and the error integrating circuit. The time constant of the damping circuit is made relatively low and comparable to the speed of response of the hydraulic system and gun so that its output may be effective in damping oscillations of these elements whereas the time constant of the error integrating circuit comprising condenser 73 is made much larger so that its output is effective only in preventing persistent or slowly changing errors and does not appreciably interfere with the damping of the relatively rapid oscillations of the gun and stroke rod. Moreover, the voltage resulting from the charging of condenser 73 in the absence of a persistent cause disappears after an interval determined by the time constant of its circuit so that, for example, after acceleration ceases, the circuit as a whole returns to its normal mode of operation and control by the integrated error voltage ceases. The control exercised by the error integrating circuit is limited not only as to time but also as to magnitude by the characteristics of the phase-sensitive rectifier circuit comprising tube 75 and biasing means 76. The maximum output voltage obtainable from such a phase-sensitive rectifier circuit is limited by the magnitude of the fixed A. C. bias. In the present case the effective output potential of the error integrating circuit is limited in this manner to a value just sufficient to compensate for expected amplifier unbalance and to minimize acceleration lags. If this signal were not limited, it would result in excessive overshooting of the gun when synchronizing through large angles.

The operation of the system as described so far has been concerned with the control exercised by the fine channel only. When the error exceeds the effective range of control of this channel roller 96 is positioned to make contact with segment 97 or 98 and a relatively large A. C. input signal is supplied to amplifier 28 from the secondary of transformer 100. Motor 44 remains under the predominant control of the coarse error signal until roller 96 is returned to the dead spot between segments 98 and 97, as illustrated. The error is then reduced to a value within the control range of the fine channel.

Referring now to the Figure 2, it will be seen that the general arrangement is similar to that of Figure 1, and that many of the elements are the same as in the preceding figure, and are similarly referenced. Fine and coarse data transmission channels are utilized as in Figure 1 and in the fine channel the voltage induced in winding 18 of receiver 17 is applied to a potential divider 111 and a desired portion of this voltage, as determined by the adjustment of tap 112, is applied across a voltage limiting or signal shaping circuit comprising resistance 114 and rectifiers 115 and 115'. These rectifiers, which are preferably of the dry-disc type, have non-linear voltage-current characteristics which limit the peak value of the fine error signal effective as an input to amplifier 145.

In addition to the circuit just described, the voltage across winding 18 is also applied by way of transformer 118 to a rate-taking circuit comprising a full-wave phase-sensitive rectifier of a type previously described, which includes bridge type rectifiers 120 and 120', biased from the common A. C. source by voltages applied through transformers 122, 122'. The output of this circuit is a reversible polarity D. C. voltage, the polarity corresponding to the phase of the input A. C. voltage. A low-pass filter 123 removes ripple from the output which is then applied to the differentiating or rate-taking elements proper which are condenser 124 and resistance 125, connected in series. As is known, to effect differentiation the reactance of condenser 124 should be large in comparison with the value of resistance 125, or, otherwise stated, the time constant (R C) should be low. The variable D. C. voltage across resistance 125 is made substantially proportional in this manner to the rate of change of the error signal and this voltage is combined in series with the A. C. error signal voltage existing across the series-parallel circuit including resistance 114 and rectifiers 115 and 115'. The use of condenser-resistance networks to obtain a rate signal or a combination of error and rate signals is fully described in U. S. Patent No. 2,233,415 to H. L. Hull, one of the present applicants, dated March 4, 1941. Such a network may, of course, be used for similar purposes in the circuit of Figure 1.

As in the arrangement of Figure 1, further correcting voltages may be utilized such as that obtained from the error integrator circuit whose output is the variable D. C. potential across condenser 73, and from the damping circuit whose output appears across condenser 71 and a portion of resistance 70.

The coarse transmission channel of Figure 2 comprises transmitter 14 electrically connected to receiver 91 which operates shaft 92 mounting contact 127 which contact, upon suitable displacement, may be closed to either of contacts 128 or 128'. Contact 127 is connected to the junction point between condenser 73 of the error integrating circuit and adjustable contact 72 on resistance 70 of the damping control circuit. Since contacts 128 and 128' are both connected to the upper extremity of resistance 125 of the error rate circuit, the closing of contact 127 to either of these contacts short-circuits the outputs of the fine error, fine error rate and error integrating circuits, and permits the application to the input of amplifier 145 of only the output of the damping circuit and the coarse error circuit. A resistor 230 is provided which in such a case prevents a complete short circuit of the voltage outputs of the fine error, fine error rate, and error integrating circuits by providing a load for the combined voltage output of these circuits.

It is, of course, to be understood that the contacts 128 and 128' are both mounted upon a suitable support which is rotated with the gun 20 or the gun platform 59, so that the contact arm 127 will engage one or the other of contacts 128, 128' only when the error or lack of positional agreement between the gun and the data attains or exceeds a predetermined value. Such an arrangement would be generally similar to the construction shown in Fig. 1 in which the segments 97 and 98 are rotated in correspondence with the gun, while the arm 95 carrying contact roller 96 is operated by the receiver 91.

The coarse error signal itself is derived from Selsyn signal generator or synchro-transformer 130 whose three-part rotor winding is bridged across transmission line 90 in parallel with the winding of the receiver 91. Stator 132 of generator 130 is driven from shaft 21' which, in turn, is driven from the gun mount. The winding of stator 132 receives a reversible phase A. C. voltage proportional to the error in 1:1 relationship in contrast to the 16:1 or other relationship of the fine error signal. The A. C. voltage may be utilized to control the operation of motor 44 directly as in the case of fine error control. As a modification which has certain advantages, however, one may translate the coarse signal into a D. C. voltage by the use of transformer 134 connected to a full-wave phase-sensitive rectifier circuit comprising bridge type rectifier 135, 135', which is biased from the A. C. source through transformers 136, 136' as in the case of similar circuits previously described. The output of the rectifier circuit is a D. C. potential of reversible polarity from which ripple is removed by low-pass filter 140. The coarse error signal output from filter 140 in the form of a reversible polarity D. C. voltage is applied in series with the fine error, error rate and integrated error signals and a combination of all these signals is applied to the input of amplifier 145.

In the operation of the described circuit of Figure 2, a change of gun azimuth angle as represented by the change of the angular position of shaft 10 in the director causes a signal to be transmitted to fine signal receiver 17 and the corresponding voltage induced in winding 18 causes an A. C. signal to be applied to the input of amplifier 145. If the angular displacement of shaft 10 does not exceed a certain predetermined limit which causes the non-linear characteristics of rectifiers 115 and 115' to be brought into play, an alternating current proportional in magnitude to the magnitude of the displacement of shaft 10 and corresponding in phase to the direction thereof flows in winding 43 of motor 44 and causes operation of this motor to change the position of the stroke rod of the hydraulic drive and thereby a change in the operating speed of gun 20 in the proper direction to wipe out the error.

At the same time, overshooting of the position of rest by gun 20 is prevented by the D. C. voltage across resistance 125 proportional to the rate of change of the error. This voltage causes a change of bias of the first amplifier tube 150 which results in a proportional change in the A. C. output of this tube as has been described in connection with the arrangement of Figure 1. The effect of the integrated error signal obtained from condenser 73 has also been fully described. For a further description of error rate circuits and their use in preventing overshooting and hunting of a controlled object reference may be had to Patent No. 2,233,415, above referred to.

Due to the fact that the control terms which are used for stabilizing the system, such as the damping and error integrator circuit voltages are inherently limited to maximum values determined by the natures of the circuits, it is desirable that the error signal be similarly limited in order to prevent undue changes of the ratio of stabilizing signal to error signal with resulting change in the degree of stability. This is accomplished by the error signal limiting circuit comprising rectifiers 115 and 115' which greatly reduces the range of variation of the ratio of the two types of signals.

Should the error be outside of the range of control of the fine channel in either direction, the signal received by coarse channel receiver 91 causes the closing of contact 127 to either of contacts 128 or 128' and thereby short-circuits the output of the fine error and fine error rate circuits. When the coarse channel has control it applies a reversible phase voltage to winding 43 of motor 44 in the same manner as the fine channel and thus causes the hydraulic drive to change the rate or direction of operation of the gun. At the time the control is shifted to the coarse channel the magnitude of the fine error is limited by the characteristics of rectifiers 115 and 115'.

The further modifications of the invention shown in Figures 3-6 have to do principally with various ways in which the damping terms may be obtained and the means which cause their decay. In the arrangements of Figures 1 and 2, if the error integrator and stroke rod damping voltages are neglected, the control of the driving means, when the controlled object is accelerating or decelerating, is in accordance with the difference of the error signal and the controlled object damping signal (stroke rod position). The damping signal is of particular importance, in preventing overshooting of the controlled object as the error signal is reduced and the system approaches constant velocity operation. When the system settles down to constant velocity operation the damping term or signal is no longer required and if retained results in a lag in following since it must be balanced by an equal and opposite error term. To eliminate this so-called speed lag, the damping signal, which in the arrangements described so far is the voltage on condenser 71, is allowed to die out by the discharge of the condenser over a period determined by the time constant of the damping control circuit. No error signal being then required, the system operates without speed lag.

Figures 3 and 5 show systems generally similar to those of Figures 1 and 2, comprising azimuth transmitter 12 driven from shaft 10 and synchro-transformer 16 driven from platform 59, to generate the error signal which is applied to potential divider resistance 24 as in previously described arrangements. The error rate and error integrator circuits and other features of the circuits of Figures 1 and 2 have been omitted in Figures 3 and 5 for simplicity of illustration, the principal purpose of these figures being to illustrate modifications of the damping control circuit. The stroke rod generator 65, which is to be found in Figures 1 and 2, is omitted in Fig. 3 and in its place there is provided a potentiometer 170 excited from a D. C. source shown as battery 171, and on stroke rod 53 there is mounted a contact 172 which is slidable on resistance 170 in correspondence with displacement of the rod. The D. C. potential difference, of reversable sign, between contact 172 and a central tap 173 on resistance 170 is, in the arrangement of Figure 3, applied to an electrical differentiating circuit comprising condenser 175 and resistance 176 in series, the output being the voltage across the resistance. In order to function as a differentiating circuit, the time constant of the combination of condenser and resistance should be low, complete differentiation being approached as this time constant approaches zero. Under suitable conditions, therefore, the voltage across resistance 176 may be caused to be substantially proportional to the first time derivative of the voltage input to the differentiating circuit, and since the input voltage is proportional to the position of stroke rod 53 the voltage across resistance 176, when complete differentiation occurs, is proportional to the rate of change of this position, that is, to the velocity of rod 53. The time constant of the differentiating circuit may, according to the invention, be adjusted to a value at which complete differentiation does not occur, and under this condition the voltage across resistance 176 may be resolved into two components, one of which is proportional to and in phase with input voltage, and the other of which is the first time derivative of said voltage. These components, therefore, are respectively proportional to stroke rod position and stroke rod velocity. When the system attains constant velocity operation, condenser 175 becomes charged to a voltage equal to the input voltage and the charging (or discharging) current, and hence the voltage drop across resistance 176 tends to decay to zero, thus wiping out the damping term. It will be apparent, that the control terms furnished by the output of the differentiating circuit of Figure 3 are in effect the respective equivalents of the control terms furnished by the integrating circuit comprising condenser 71 and resistances 69 and 70 of Figures 1 and 2. They are therefore suitable for damping oscillations of the gun and of stroke rod 53, and by their decay during constant velocity operation permit the system to operate without speed lag.

As in previously described arrangements the voltages representing the damping terms are combined with the error signal to form the input to amplifier 28. When the ratio of the two damping terms may be adjusted in the arrangement of Figure 3 by choosing suitable values for resistance 176 and condenser 175, in some cases it is preferable to have an independent adjustment of this ratio, such as is shown, for example, in the damping circuit of Figure 4 which may replace the similar circuit of Figure 3. In the modification of Figure 4, condenser 175 is replaced by condenser 175' and 180 in series, and condenser 175' is shunted by adjustable resistance 178. Condenser 180 is of relatively large capacity and serves principally as a blocking condenser to prevent a steady voltage from potentiometer 170 being applied to amplifier 28. The effect of resistance 178 is to permit a component current to flow in resistance 176 which is independent of the charging current of condenser 175', and which is therefore directly proportional to the input voltage rather than to the derivative thereof. Consequently, by adjusting the effective value of resistance 178, an adjustment of the ratio of the two damping control terms is obtained.

In the arrangements of Figures 1, 2, 3, and 4, the damping voltage is reduced to zero by the discharge of the condenser or condensers in the integrating or differentiating circuits. In the further modifications of our invention shown in Figures 5 and 6, a damping signal derived from stroke rod position is obtained which is caused to decay during constant velocity operation through mechanical means.

Referring more particularly to Figure 5, there is shown as before an arrangement whereby an error signal is obtained across potential dividing resistance 26. For combination with this signal, a stroke position signal, which in this case is an alternating potential signal, is obtained by the use of a variable inductance transformer 185 comprising a stationary three-legged core 186 and an armature 187 displaceable relative thereto. The central leg of core 186 carries an exciting winding 184 supplied with alternating current from a suitable source. When armature 187 is in a central position relative to the core, equal and opposite alternating voltages are induced in serially connected pickup windings 188 and 188' forming a two-part output circuit on the outer legs of the core. Upon displacement of armature 187 from a central position in a direction perpendicular to the core legs, unequal voltages are induced in windings 188 and 188' due to the change of mutual inductance between these windings and winding 184, and a resultant A. C. voltage is therefore obtained, as an output. Such transformers are well known in the art as non-contacting pick-offs from sensitive instruments.

The displacement of armature 187 is derived from the displacement of stroke rod 53 through dash pot 190 against the opposition of centralizing spring 192. Piston 191 of dash pot 190 has a small and preferably adjustable leak or vent 193 which controls the speed at which cylinder 194 of the dash pot moves in response to displacement of piston 191. In operation a displacement of stroke rod 53 causes an initial displacement of armature 187 against the opposition of spring 192 with a resulting voltage output from winding 188, 188' proportional to stroke rod displacement. Should the displacement of rod 53 then cease armature 187 is gradually returned to its central position under the influence of spring 192 and thereby wipes out the stroke rod position signal.

The equivalence of the arrangement of Figure 5 and that of Figures 1 and 2 will be apparent. Further similarity may be found in the adjustment of vent 193 and the adjustments of resistance 69 and the position of contact 72 of Figures 1 and 2. Thus, if there is a very small leak of fluid past or through piston 191 the displacement of armature 187 and hence the output of winding 188, 188' will follow very closely the displacement of stroke rod 53, to which it will be substantially rigidly connected, whereas with large leakage the displacement of armature 187 will be more nearly proportional to the viscous drag, that is proportional to the velocity of rod 53. Obviously, adjustment of vent 193 provides means of obtaining an output from winding 188, 188' having components proportional to stroke rod position and stroke rod velocity in an adjustable ratio. Not only is the adjustment of this ratio determined by leak 193, but it is also affected by the stiffness of spring 192. Thus, a stiff spring tends to result in an output proportional to stroke rod velocity, while a weak spring tends to result in an output proportional to stroke rod position.

In the modification of Figure 6, the described effects of time delay devices are utilized in a manner which allows the generation of the two described output components to be more clearly traced.

Referring now to Figure 6, which is concerned only with the details of the damping control, there is shown an unequal arm lever 200 tiltable upon displacement of stroke rod 53 about a fulcrum 202 by means of a pin and slot connection 201. Opposite ends of lever 200 are pivotally connected to piston rods 204 and 205, respectively connected to piston 206 of dash pot 208 and piston 207 of dash pot 209. Piston 206 moves in dash pot cylinder 212 and has a small vent hole or leak 213, while piston 207 moves in dash pot cylinder 215 and has a relatively larger vent 216. Cylinder 212 is connected by rod 218 to displace three-legged core 186' corresponding to core 186 of Figure 5, against relatively weak centralizing spring 217, while cylinder 215 is connected by rod 219 to displace armature 187', against relatively stiff centralizing spring 220. Three-legged core 186' carries exciting winding 184 and two-part output winding 188, 188' as in the case of core 186.

In operation displacement of stroke rod 53 causes the almost immediate displacement of core 186' because of the relatively weak restraining action of spring 217, and the relatively small leakage through vent 213, and this motion therefore of itself would cause an output potential in winding 188, 188' proportional to stroke rod position. This displacement of armature 187', however, because of the relative large leakage through vent 216, and the relatively stiff opposition of spring 220 is more nearly proportional to the velocity of rod 53. Since the output from winding 188, 188' is proportional to the relative displacement of core 186' and armature 187', this output may be considered to be composed of two components as before.

It will be understood that suitable guides or restraints are to be provided to limit the displacements of core 186' and armature 187' to the described movements of translation.

In the various modifications of the invention disclosed herein input shaft 10 has been principally described as receiving angular data from a fire control director for reproduction as aiming angles of a gun. Obviously our invention has much wider application and accordingly it is to be understood that we may employ, within the scope of our invention, any positionable controlling object or member as a source of positional data and likewise may cause any positionable controlled object or member to follow the position of the controlling object by the described driving means and controls therefor. For example shaft 10 may be actuated by a telescope or other sighting means, while in place of gun 20 we may control the position of a searchlight or other ponderable object.

As many changes could be made in the above construction and many apparently widely different embodiments of this invention could be made without departing from the scope thereof, it is intended that all matter contained in the above application or shown in the accompanying drawings shall be interpreted as illustrative and not in a limiting sense.

Having described our invention, what we claim and desire to secure by Letters Patent is:

1. A positional control system comprising a standard of position, a controlled object to be kept in positional agreement with said standard of position, a variable speed driving means for the object including an adjustable controller, the speed of said driving means being dependent upon the position of said controller and variable in accordance with variations in position thereof, means responsive to disagreement of position of said standard and object furnishing a signal proportional to such disagreement, means furnishing a second signal responsive to the rate of movement of said controller, integrating means for deriving from said second signal a third signal substantially proportional to the amount of change in position of said controller, said last-named means incorporating a signal decaying device for eliminating said third signal during constant speed operation, and said driving means being controlled by a combination of said three signals.

2. A positional control system comprising a displaceable controlling object, a controlled object to be kept in positional agreement with said controlling object, variable speed driving means for the controlled object, a speed controller for said driving means including a displaceable member, the speed of said driving means being dependent upon the position of said displaceable member and variable in accordance with variations in position of said member, signal producing means responsive to the positional disagreement between said controlling and controlled objects for producing a signal proportional to the amount of disagreement, means for actuating said controller in accordance with said signal, means for damping the motions of both said controlled object and said member including means for obtaining a second signal dependent upon the velocity of said controller, an integrating network for deriving a third signal from said second signal which is integrated with respect to time and which has components respectively opposing in phase both the first and second signals, and means for actuating said controller in accordance with all three signals.

3. A positional control system comprising a displaceable controlling object, a controlled object to be kept in positional agreement with said controlling object, means for supplying a signal as a measure of the amount of positional disagreement between said two objects, variable speed driving means for the controlled object including a movable speed control member, means for positioning said control member in accordance with said signal, the operating speed of said driving means being dependent upon the position of said control member and variable in accordance with variations in position of said control member, and means actuated by said member-positioning means to supply a signal output for effecting a further control over said member-positioning means during changes in the position of said member, said latter signal being supplied in opposition to said first mentioned signal.

4. A positional control system comprising a displaceable controlling object, a controlled object to be kept in positional agreement with said controlling object, means for supplying a signal as a measure of the amount of positional disagreement between said two objects, variable speed driving means for the controlled object including a settable speed control and means for setting the same, the operating speed of said driving means being dependent upon the setting of said control and variable in accordance with variations in the setting thereof, means for actuating said control-setting means in accordance with the magnitude of said signal, and transiently operable means controlled by said setting means and having an output connected to modify the setting of said control, said last-mentioned means including means for reducing the output thereof substantially to zero after the setting of said speed control becomes unchanging.

5. A positional control system comprising a displaceable controlling object, a controlled object to be kept in positional agreement with said controlling object, means for supplying a signal as a measure of the amount of positional disagreement between said two objects, variable speed driving means for the controlled object including a settable speed control member, the operating speed of said driving means being dependent upon the position of said control member and variable in accordance with variations in position of said member, means for actuating said control member under the control of said signal, and a feedback connection from said control member to said actuating means including means having an output for modifying the actuation of said control member in an amount depending upon changes in position of said control member, and means for causing the output of said modifying means to decay substantially to zero after a change in position of said control member.

6. In a positional control system for positioning an object in accordance with a variable primary signal, a variable speed driving means for said object, a second signal producing means responsive to the rate of change of speed of said driving means, means for integrating said second signal with respect to time to produce a third signal, including means causing said third signal to decay with time, and means for controlling the speed of said driving means from a combination of said three signals.

7. A positional control system comprising a displaceable controlling object, a controlled object to be kept in positional agreement with said controlling object, means for supplying a signal proportional to the positional disagreement of said two objects, variable speed driving means for the controlled object including a speed controller therefor, the operating speed of said driving means being dependent upon the position of said controller and variable in accordance with variations in the position thereof, means for actuating said controller under the control of said signal, means for supplying a second signal to said controller-actuating means when a change in position of said controller occurs, and means for causing said second signal to decay substantially to zero during a time interval after the setting of said controller becomes unchanging.

8. In a positional control system for positioning an object in accordance with a variable primary signal, a controlled object, driving means for the controlled object, means furnishing a signal substantially proportional to the acceleration of said object, means furnishing a signal substantially proportional to a time integral of said first signal, and means for controlling said driving means in accordance with a combination of said signals.

9. In a positional control system for positioning an object in accordance with a variable primary signal, a controlled object, positioning means for said object including a variable speed drive and a settable speed controller therefor controlled primarily from said signal, the output speed of said drive being determined by the setting of said controller, means for obtaining a damping voltage proportional to the rate of change of the setting of said controller, a resistance-capacity network receiving said voltage, and means for utilizing the voltage drop across a capacitative element of said network to modify the control from said primary means for the setting of said speed controller.

10. The combination with a variable speed motor, of a settable controller therefor, the operating speed of said motor being dependent upon the position of said controller and variable in accordance with variations in position thereof, means for providing a variable primary signal voltage for positioning said controller, means for obtaining a second voltage proportional to the rate of change of setting of said controller, an electrical network for receiving said second voltage and comprising a resistance and a capacitance in series to produce a third voltage comprising the voltage drop across said capacitance, components of both of said second and third voltages being applied to oppose said primary signal voltage in its control over the positioning of said controller.

11. In a control system a controlled object, variable speed driving means for said object including a settable speed controller, the operating speed of said driving means being dependent upon the position of said controller and variable in accordance with variations in position thereof, means for supplying a variable primary signal voltage, means for obtaining a second voltage proportional to the rate of change of setting of said controller, a circuit receiving said voltage including a resistance and a capacitance in series, means for adjusting the time constant of said circuit, and means utilizing a third voltage developed in said circuit for opposing said primary signal in the control of said speed controller.

12. A means for reducing hunting and lag in positional control systems, comprising the combination with a controlled object, a variable speed driving means for said object including a settable speed controller, the operating speed of said driving means being dependent upon the position of said speed controller and variable in accordance with variations in position thereof, means for obtaining a damping voltage proportional to the rate of change of speed of said driving means, an adjustable time constant resistance-reactance network receiving said voltage and producing a voltage having two components, and means utilizing a combination of selected portions of both components of the voltage drops across resistance and reactance elements of said network to damp both the variable speed driving means and its connected object and said settable speed controller.

13. A means for reducing hunting and lag in positional control systems, comprising the combination with a controlled object, driving means and a speed controller therefor for driving said object, means furnishing a voltage proportional to the acceleration of said object, means for integrating said first voltage to furnish a voltage having a component proportional to the time integral of said acceleration, said last means comprising an electrical network having resistance and reactive elements, means for adjusting the time constant of said network to adjust thereby the relative magnitudes of the voltage components derived from said integrating means, and means utilizing said voltage components to control the setting of said speed controller.

14. In a control system for a positionable object, means for providing a variable primary displacement signal, variable speed driving means for the object including a settable speed controller, the operating speed of said driving means being dependent upon the setting of said controller and variable in accordance with variations in position of said controller, means for obtaining a signal dependent upon the setting of said controller and variable with variations in the setting thereof, means for deriving from said second signal a third signal proportional to the rate of change thereof, and means for displacing said controller in accordance with said primary and third signals in opposition.

15. In a control system, a controlled object, variable speed driving means for said object, including a member displaceable to control the operating speed thereof and means for obtaining a force suitable for simultaneously damping the motion of said controlled object and said member including an electrical network comprising a pair of capacitances and a resistance, all said elements being connected in series, an adjustable resistance shunting one of said capacitances, means supplying said network with a voltage proportional to the displacement of said member, and means for utilizing the voltage drop across said series resistance for displacing said member.

16. A positional control system for a gun comprising a displaceable controlling object, a gun to be kept in positional agreement with said controlling object, means for obtaining a voltage proportional to the positional disagreement of said gun and object, an amplifier receiving said voltage as an input, an electrical integrating circuit likewise receiving said voltage and supplying a voltage proportional to the time integral thereof as a further input to said amplifier, and driving means for the gun actuated in accordance with the output of said amplifier.

17. A positional control system comprising a displaceable controlling object, a controlled object to be kept in positional agreement with said controlling object, means for obtaining a reversible phase A. C. voltage proportional to the positional disagreement of said two objects, a balanced modulator receiving said disagreement voltage and biased to supply a reversible polarity D. C. output, an electrical integrating circuit receiving said D. C. voltage and supplying a voltage proportional to the time integral thereof and driving means for the controlled object actuated in accordance with said disagreement voltage and in accordance with the output of said integrating circuit.

18. A positional control system comprising a displaceable controlling object, a controlled object to be kept in positional agreement with said controlling object, means furnishing an A. C. signal proportional to the positional disagreement of said two objects, an A. C.-biased modulator receiving said disagreement signal, a resistance-capacity integrating network receiving a D. C. output component from said modulator and furnishing a voltage proportional to the time integral thereof, driving means for the controlled object, means furnishing a voltage proportional to the acceleration of the controlled object, a second resistance-capacity integrating network supplying a voltage varying with the time integral of said acceleration, and means for actuating said driving means in accordance with a combination of said disagreement signal and said two integral voltages.

19. In a positional control system including a controlling object, a controlled object and driving means for the controlled object, dual primary signal means responsive to fine and coarse positional disagreement of said two objects, means furnishing a signal responsive to the rate of change of said fine disagreement, means furnishing a signal responsive to the time integral of said fine disagreement and means for selectively controlling said driving means in accordance with one of the two primary signals, one of said signals having components respectively proportional to said fine signals and the rate of change and the integral of said disagreement and the other of said signals having a component derived from said coarse signals, said last means including selecting means actuated in accordance with the magnitude of said coarse signals.

20. In combination, a variable speed servo motor, a speed controller therefor, a motor for setting said controller, a primary signal generator for controlling said motor, means for generating a transient damping signal to oppose said primary signal including a second signal generator, and a quick-acting slow-return device connecting said generator to said controller, whereby a transient signal is developed upon acceleration of said variable speed device which decays with time.

21. In a control system, a variable speed motor for driving a movable mounted body, a displaceable speed controller therefor, means for actuating said speed controller, quick-acting, slow-return means actuated by said controller-actuating means and when a displacement of said controller occurs, comprising a dashpot having a cylinder and piston and resilient means opposing relative displacement of said cylinder and piston away from a reference position, and means actuated in accordance with relative displacement of said cylinder and piston for modifying the displacement of said controller.

22. The combination as claimed in claim 21 in which said means actuated in accordance with relative displacement of cylinder and piston comprises an inductive pick-off, an amplifier receiving the output of said pick-off and means utilizing the output of said amplifier to effect a change of displacement of said controller.

23. In a control system in combination, a displaceable input member, a two-part signal generator having an output proportional to relative displacement of the parts thereof, means connecting said member and one part of said generator comprising a dashpot device having relatively small leakage, including a cylinder, a piston and relatively weak spring means tending to centralize said piston in said cylinder, means connecting said member and the other part of said generator comprising a dashpot having relatively large leakage, including a cylinder, a piston and relatively stiff centralizing spring means, and connected means for utilizing the output of said generator.

24. In a positional control system having controlling and controlled objects and variable speed driving means for the controlled object including an adjustable speed controller for said driving means, a combination of means for securing damped operation with reduced acceleration lag comprising means for obtaining an electrical quantity varying with the positional disagreement of said two objects, an integrating circuit receiving said quantity as an input and supplying an output proportional to the time integral thereof, means for obtaining an electrical quantity varying with the acceleration of the controlled object, a second integrating circuit receiving said last quantity as an input and supplying an output having a component proportional to the time integral thereof and means for actuating said speed controller in accordance with said electrical quantity varying with positional disagreement and in accordance with components of the outputs of said two integrating circuits, said two integrating circuits having substantially different time constants.

25. In a positional control system for continuously positioning an object in accordance with a variable primary signal, variable speed driving means for said object, means for integrating said variable signal to produce a second signal, and means for controlling said variable speed drive from the sum of said signals, whereby lag of said object is mitigated.

26. In a positional control system for positioning an object in accordance with a variable primary signal, a variable speed drive for said object, means responsive to the speed of said object for producing a damping signal introducing lag only during acceleration of said object, decayed action means for integrating said primary signal producing a third signal increasing the first signal temporarily during acceleration, and means for controlling said driving means by a combination of said signals.

27. In a positional control system, the combination of relatively movably mounted sending and receiving elements, a power motor for driving the latter, means for obtaining an electrical signal proportional to the relative displacement between said elements, means for obtaining a signal proportional to the speed of said receiving element, and transiently operable means for opposing the displacement signal by said speed signal, said last named means including a device for eliminating the effect of the speed signal after a predetermined interval of operation of said receiver at constant speed.

28. In a control system for positioning an object in accordance with a variable primary signal, a first signal-producing means for producing said primary signal, a variable speed driving means for said object, a second signal-producing means responsive to the rate of change of speed of said driving means, means for integrating said second signal with respect to time to produce a third signal, and means for controlling the speed of said driving means from a combination of said first and third signals.

29. A control system of the character recited in claim 28, in which the second signal-producing means supplies a unidirectional signal voltage and said integrating means includes a resistance-reactance network connected to receive said signal voltage.

30. In a control system for positioning an object in accordance with a variable primary signal, a first signal-producing means for supplying said primary signal, variable speed driving means for said object, means responsive to the acceleration of said object for furnishing a second signal, means for furnishing a third signal substantially proportional to a time integral of said second signal including means for causing said third signal to decay with time, and means for controlling said driving means in accordance with a combination of said primary and third signals.

31. A control system of the character recited in claim 30, in which the second signal is a unidirectional signal voltage and the means for integrating said signal voltage and causing it to decay is a resistance-capacitance network connected to receive said signal voltage.

32. A positional control system comprising a standard of position, a controlled object to be kept in positional agreement with said standard of position, a variable speed driving means for the object including an adjustable controller, the speed of said driving means being dependent upon the position of said controller and variable in accordance with variations in position thereof, means for supplying a first signal proportional to the amount of disagreement in position of said object and standard of position, means responsive to the rate of movement of said controller for supplying a second signal, integrating means for deriving from said second signal a third signal substantially proportional to the amount of change in position of said controller, and means for controlling the speed of said driving means in accordance with a combination of said three signals.

HARVARD L. HULL.
WILLIAM S. GORRILL.
WILLIAM F. FROST.